F. M. MOODY.
LAWN MOWER.
APPLICATION FILED JAN. 12, 1910.
994,184.
Patented June 6, 1911.
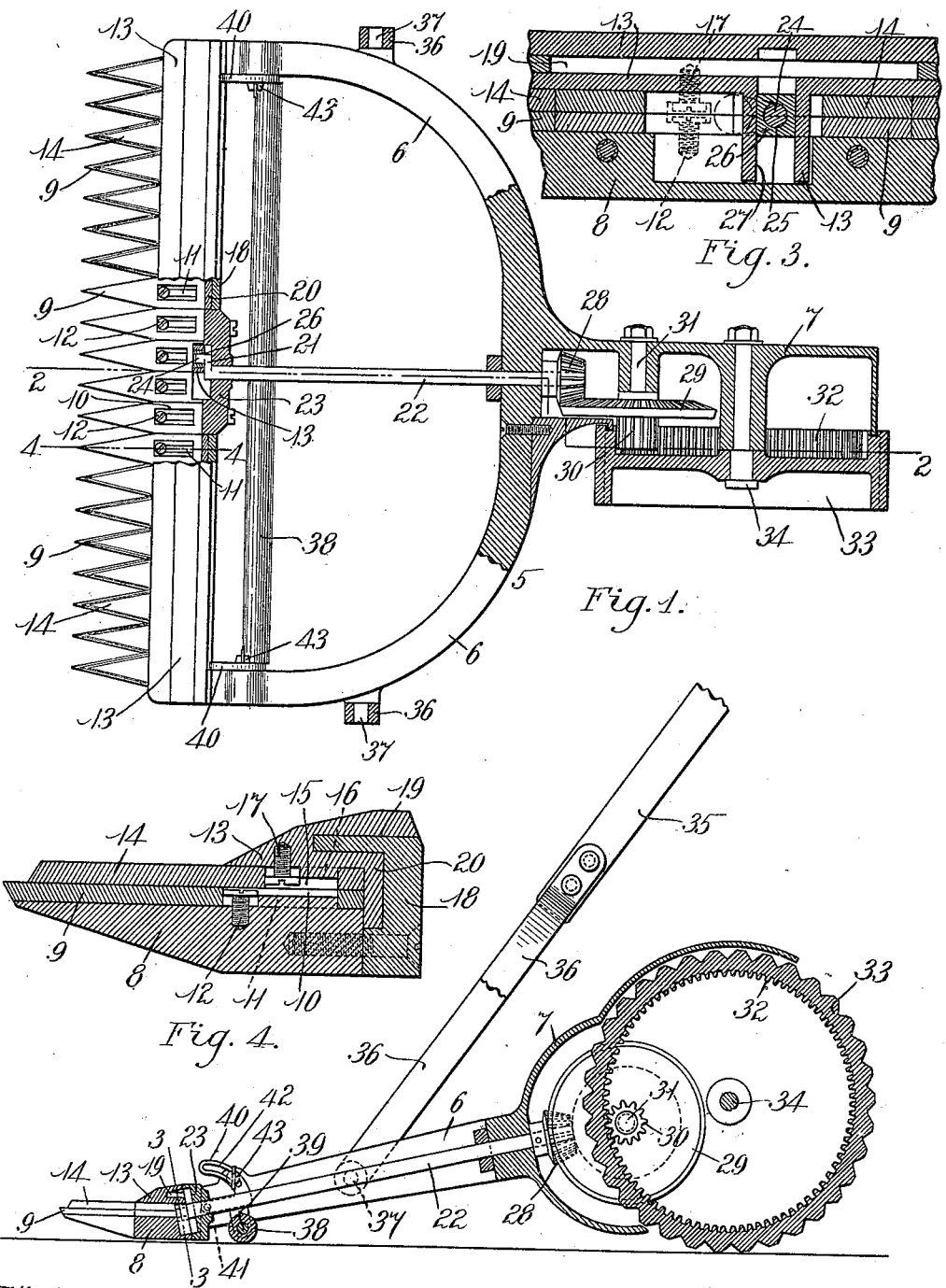

UNITED STATES PATENT OFFICE.

FRED M. MOODY, OF WHITMAN, MASSACHUSETTS.

LAWN-MOWER.

994,184.  Specification of Letters Patent.  Patented June 6, 1911.

Application filed January 12, 1910. Serial No. 537,613.

*To all whom it may concern:*

Be it known that I, FRED M. MOODY, a citizen of the United States, residing at Whitman, in the county of Plymouth and State of Massachusetts, have invented new and useful Improvements in Lawn-Mowers, of which the following is a specification.

This invention relates to lawn mowers and the object of the invention is to provide a lawn mower which is so constructed that the same can be run close to a building or on the edge of a walk while cutting the grass; also which is so constructed that the same may be used for cutting close to borders of flower beds and beneath the flowers which project over said borders, and also so constructed that the same may be used in cutting grass of considerable length as compared with the ordinary lawn mower with rotary blade.

The object of the invention is further to provide a lawn mower which can be built cheaply, which is simple and strong in its construction, and, furthermore, which is so constructed that separate teeth can be removed and new teeth put in their place when any of said teeth shall become dulled or injured.

The lawn mower of my invention is further so constructed and the power for pushing the same applied thereto in such a manner that the greater the obstruction to the movement of the lawn mower, the more firmly said lawn mower will be pressed toward the ground. Said lawn mower is further so constructed and arranged in its separate parts that it has only one drive wheel and thus does not press the grass down at the sides of the lawn mower to prevent its being cut by the blades when the lawn mower is passed over the ground a second time. Furthermore, with such a construction of a single wheel, with the cutters arranged and constructed as hereinafter fully described, the lawn mower will adapt itself to inequalities of the ground with much more facility than in that class of lawn mowers in which two drive wheels are employed. Also, the entire construction of the machine is not only cheapened, but rendered lighter as compared with machines having two drive wheels.

The invention consists in the combination and arrangement of parts set forth in the following specification and particularly pointed out in the claims thereof.

Referring to the drawings: Figure 1 is a plan view, partly in section, of my improved lawn mower. Fig. 2 is a sectional elevation of the same taken on line 2—2 of Fig. 1. Fig. 3 is a sectional elevation taken on line 3—3 of Fig. 2. Fig. 4 is a detail sectional elevation taken on line 4—4 of Fig. 1.

Like numerals refer to like parts throughout the several views of the drawings.

In the drawings, 5 is a Y-shaped frame upon which the different parts are mounted, said frame consisting of two arms 6, 6 and a body portion 7. The outer ends of the arms 6, 6 are joined together by a stationary cutter holder 8 and to this stationary cutter holder are fastened a series of blades 9, 9. Each of the blades 9, 9 is slotted at 10 to receive a key or "feather" 11 which projects upwardly into the slot 10 from the holder 8. Screws 12, 12 hold the blades 9, 9 firmly attached to the blade holder 8. Another cutter blade holder 13 is slidably mounted upon the stationary cutter blade holder 8. This cutter blade holder 13 is also provided with a series of cutter blades 14, 14 slotted at 15, 15 to receive keys 16, 16 which project into said slot from the cutter holder 13. Said blades 14 are fastened to the cutter holder 13 by screws 17, 17. The cutter holder 13 is guided to slide upon the cutter holder 8 by guide plates 18, 18 which are fastened to the holder 8 and project into slots 19, 19 in the holder 13. Said holder 13 is also provided with a downwardly projecting flange 20 which bears against the holder 8 and is guided between said holder and the plates 18 against lateral movement, while at the same time being held against vertical movement by the inwardly projecting upper ends of the guide plates 18, 18.

A reciprocatory motion is imparted to the holder 13 and to the cutter blades 14 fast thereto by a crank 21 which is formed upon one end of a shaft 22 having a bearing at one end thereof in a plate 23 fast to the cutter blade holder 8 and at the other end thereof in the frame 5, the plate 23 forming, in effect, a part of the cutter blade holder 8.

A crank-pin 24 projects into a hole 25 in the sliding block 26, said block being arranged to slide in a vertical slot 27 formed in the reciprocatory cutter blade holder 13.

The shaft 22 is rotated by a pinion gear 28 which meshes into a bevel gear 29 fast to a pinion 30, said pinion 30 and bevel gear 29 being rotatably mounted upon a stud 31 fast to the body portion 7 of the frame 5. The pinion gear 30 meshes into an internal gear 32 on the drive wheel 33. The drive wheel 33 is provided with corrugations upon its periphery in the usual well known manner, and is rotatably mounted upon a stud 34 fast to the frame 5.

The machine, as a whole, is propelled by a handle 35 having two arms 36, 36 pivoted to pins 37, 37 fast to the arms 6, 6. The height of the cutter blades from the ground is regulated, in order to regulate the length of the grass cut, by means of a roll 38, rotatably mounted on a shaft 39 which is fastened to arms 40, 40 pivoted at 41 to the arms 6, 6 of the frame. The arms 40, 40 have segmental slots 42, 42 therein and said arms are clamped to the arms 6, 6 of the frame by screws 43 which pass through the slots 42 and have screw-threaded engagement with the frame arms 6, 6. By loosening the screws 43, 43 and tipping the arms 40 downwardly, it will be seen that the roll 38, will be lowered relatively to the frame and, therefore, that the frame, together with the cutters thereon, will be raised relatively to the ground at the front end of the frame. When the desired height is obtained, the roll is clamped in position relatively to the frame by tightening the screws 43, 43.

The general operation of the mechanism hereinbefore specifically described is as follows: The machine, as a whole, is pushed forward or drawn backwardly by means of the handle 35, which, being attached to the frame 5 by the pivotal pins 37, 37, applies the pressure for holding the front portion of the frame and the cutters thereon downwardly when in working position, by reason of the fact that said pins are located between the cutters and the single drive wheel 33. As the machine is pushed forwardly, the drive wheel 33 is rotated in the usual manner, thus imparting a rotary motion to the pinion 30 and bevel gear 29 through the internal gear 32, thus rotating the bevel pinion 28 and the shaft 22 to which it is fast. The crank pin 24, through the rotation of the shaft 22, imparts a reciprocatory motion to the holder 13 and to the cutters attached thereto. Thus, as the cutter blades 14 slide over and in contact with the cutter blades 9 the grass is cut in a manner well known to those skilled in this art. It will be understood that the cutter blades 14 and 9 are held in position by the screws 17 and 12, respectively, and by the "feathers" or keys 16 and 11, respectively, so that if it is desired to remove one of the cutter blades it can be done by simply taking out its screw and removing the blade from the key which projects into the slot therein. Said blade can then be replaced by a new blade or can be readily sharpened.

Having thus described my invention, what I claim and desire by Letters Patent to secure is:

1. A lawn mower having, in combination, a Y-shaped frame consisting of a body portion and two arms, a stationary cutter blade holder connecting the free ends of the arms of said Y-frame together, a series of cutter blades fast to said cutter blade holder, a cutter blade holder slidably mounted on said stationary cutter blade holder, a series of cutter blades fast to said slidable cutter blade holder adapted to coact with said stationary cutter blades in the cutting operation, a single drive wheel rotatably mounted on the body portion of said Y-frame, gearing driven by said drive wheel also mounted on said body portion at the rear of said arms, a shaft driven by said gearing, said shaft extending longitudinally of said frame and located midway between said arms, and a crank-pin on said shaft at its forward end projecting into a slot provided in said movable cutter blade holder.

2. A lawn mower having, in combination, a Y-shaped frame consisting of a body portion and two arms, a stationary cutter blade holder connecting the free ends of the arms of said Y-frame together, a series of cutter blades fast to said cutter blade holder, a cutter blade holder slidably mounted on said stationary cutter blade holder, a series of cutter blades fast to said slidable cutter blade holder adapted to coact with said stationary cutter blades in the cutting operation, a single drive wheel rotatably mounted on the body portion of said Y-frame, gearing driven by said drive wheel also mounted on said body portion at the rear of said arms, a shaft driven by said gearing and journaled at one end thereof in said Y-frame, a plate fast to said stationary cutter blade holder in which the other end of said shaft is journaled, and a crank-pin on the forward end of said shaft projecting into a slot provided in said movable cutter blade holder.

In testimony whereof I have hereunto set my hand in presence of two subscribing witnesses.

FRED M. MOODY.

Witnesses:
LOUIS A. JONES,
SADIE V. MCCARTHY.

---

Copies of this patent may be obtained for five cents each, by addressing the "Commissioner of Patents, Washington, D. C."